(12) United States Patent
Papafagos et al.

(10) Patent No.: US 10,926,752 B2
(45) Date of Patent: Feb. 23, 2021

(54) SERVICABLE FILTER GLADHAND ASSEMBLY

(71) Applicant: Tectran Mfg. Inc., Cheektowaga, NY (US)

(72) Inventors: James C. Papafagos, North Java, NY (US); Edward H. Badhorn, Clarence Center, NY (US)

( * ) Notice: Subject to any disclaimer, the term of this patent is extended or adjusted under 35 U.S.C. 154(b) by 280 days.

(21) Appl. No.: 15/976,270

(22) Filed: May 10, 2018

(65) Prior Publication Data

US 2018/0326963 A1    Nov. 15, 2018

Related U.S. Application Data

(60) Provisional application No. 62/505,547, filed on May 12, 2017.

(51) Int. Cl.
*B60T 17/04* (2006.01)
*F16L 37/62* (2006.01)
(Continued)

(52) U.S. Cl.
CPC ............ *B60T 17/043* (2013.01); *B01D 39/12* (2013.01); *B01D 46/2403* (2013.01); *F16L 37/256* (2013.01); *F16L 37/62* (2013.01)

(58) Field of Classification Search
CPC ....... B60T 17/043; F16L 37/256; F16L 37/62; B01D 46/24; B01D 39/01
See application file for complete search history.

(56) References Cited

U.S. PATENT DOCUMENTS

| D764,641 S | * | 8/2016 | Papafagos | .................... D23/262 |
| 10,611,355 B2 | * | 4/2020 | Sonar | ....................... B60D 1/64 |
| 2019/0031169 A1 | * | 1/2019 | Sonar | .................... B60T 17/043 |

FOREIGN PATENT DOCUMENTS

| DE | 1767438 U | 5/1958 |
| DE | 102015112487 A1 | 2/2017 |

(Continued)

OTHER PUBLICATIONS

Stainless steel wire mesh filter cap/filter strainer cone /filter basket. Catalog [online]. Alibaba.com [retrieved on Jan. 29, 2016] Retrieved from the Internet: <URL: http:alibaba.com/product-detail/Stainless-steelwire-mesh-filter-Cap_60339162128.html?spm=a2700.7724857.29.3.OtMFQZ>. (Year: 2016).*

(Continued)

*Primary Examiner* — Robert Clemente
(74) *Attorney, Agent, or Firm* — Verrill Dana, LLP

(57) ABSTRACT

A gladhand assembly having a conduit for carrying a fluid and a port having a sidewall defining an interior region. The port also having a first opening in communication with an external environment and a second opening in communication with the conduit. The port includes a first recess in the interior region and disposed in the sidewall. There is a filter member including a sidewall and a first opening including a rim. The rim extends outwardly from the sidewall in a radial direction and is seated on the first recess in the sidewall of the port. There is a seal member configured to engage with and close the first opening in the port and the seal member includes a film having a first surface facing the external environment and a second surface facing the interior region of the port. The film includes a re-closable aperture.

10 Claims, 7 Drawing Sheets

(51) Int. Cl.
  *B01D 46/24* (2006.01)
  *B01D 39/12* (2006.01)
  *F16L 37/256* (2006.01)

(56) References Cited

FOREIGN PATENT DOCUMENTS

| EP | 2514649 A2 * | 10/2012 | ............ B60T 17/043 |
| EP | 2514649 A2 | 10/2012 | |

OTHER PUBLICATIONS

Gladhand Filters. Catalog [online]. Tectran Mfg. Inc. [retrieved on Mar. 13, 2016]. Retrieved from the Internet: <URL: http://www.tectran.com/catalog.asp main=air&sub1=gladhands_and_accs&sub2=&product=ladhand_filters>.

Supreme Powder Coated Gladhands. Catalog [online]. Tectran Mfg. Inc. [retrieved on May 9, 2018] Retrieved from the Internet: <URL: http://www.tectran.com/catalog.asp main=air&sub1=gladhands_and_accs&sub2=aluminum_gladhands&product=powder_coated_gladhands>.

Stainless steel wire mesh filter cap/filter strainer cone /filter basket. Catalog [online]. Alibaba.com [retrieved on Jan. 29, 2016] Retrieved from the Internet: <URL: http:alibaba.com/product-detail/Stainless-steelwire-mesh-filter-cap_60339162128.html?spm=a2700.7724857.29.3.OtMFQZ>.

International Search Report and Written Opinion, dated Sep. 21, 2018, received in international patent application No. PCT/US2018/032057, 11 pages.

* cited by examiner

SERVICABLE FILTER GLADHAND ASSEMBLY

CROSS-REFERENCE TO RELATED APPLICATIONS

This application claims benefit of priority of U.S. Provisional Patent Application Ser. No. 62/505,547 filed May 12, 2017, which is incorporated herein by reference.

FIELD OF THE INVENTION

The invention described herein relates generally to gladhand assemblies and, more specifically, to gladhand assemblies with serviceable filters.

BACKGROUND OF THE INVENTION

A gladhand connector or coupler is an interlocking hose coupling fitted to hoses supplying pressurized air from a tractor unit to air brakes on a semi-trailer, or from a locomotive to railway air brakes on railroad cars. Gladhand connectors resemble a pair of "hands shaking" when interlocked, hence the name. They are designed to allow the driver to disconnect without a mechanic or tools and they sometimes utilize a quick release style to speed up brake release time. A tractor/trailer typically has two gladhands, one for service brakes and another for emergency brakes, which are color coded. Within the United States, the service brake lines are blue and emergency brake lines are red according to SAE standard J318.

Gladhand couplers are typically genderless or hermaphroditic, allowing them to be freely connected to each other. Mated rubber grommets or seals on each of the gladhands provide a positive seal when the two gladhands are mated and the lines are pressurized. When the lines are depressurized, the joined halves separate automatically. Also, included within the interior of the gladhands is a filter basket. The seal and the filter basket prevent the entry of some debris into the hoses/system to which the gladhand couplers are connected, but a better seal and filter system which can better prevent debris from entering the system and which can be more easily cleaned during servicing is desired.

The benefits and advantages of the present invention will be readily apparent from the Brief Summary of the Invention and Detailed Description to follow.

BRIEF SUMMARY OF THE INVENTION

A first embodiment of the invention includes a gladhand assembly configured to be coupled to a corresponding gladhand assembly, between which a fluid will flow. The gladhand assembly includes a conduit for carrying the fluid, which will flow and a port having a sidewall defining an interior region. The port has a first opening in fluid communication with an external environment and a second opening in fluid communication with the conduit. The port also includes a first recess in the interior region and disposed in the sidewall. There is a filter member including at least one sidewall and a first opening at a first end of the filter member including a rim. The rim extends outwardly from the sidewall in a radial direction and being seated on the first recess in the sidewall of the port. There is a seal member configured to engage with and close the first opening in the port and the seal member includes a film having a first surface facing the external environment and a second surface facing the interior region of the port. The film includes a re-closable aperture.

In certain embodiments one or more of the following features may be included. The filter member may include a mesh filter. The mesh filter may comprise a metallic material. The filter member may further include a bottom surface at a second end of the filter member. The sidewall of the port may be cylindrical in shape and the first recess may be disposed about the sidewall and is cylindrical in shape. The port may include a second, cylindrically shaped recess disposed in the sidewall located between the first recess and the first opening of the port. The seal member may include a circular head portion having a first diameter and a circular flange portion having a second diameter. The first diameter may be larger than the second diameter. The seal member may include an inner cylindrical wall positioned between the head portion and the flange portion and may have a diameter less than that of the first diameter and the second diameter. The seal member may include a seal member recess defined by a space formed between the head portion and the flange portion and may terminate at the inner cylindrical wall. The first opening in the port may include a cylindrical lip which projects into the seal member recess and the flange portion of the seal member may project into the second recess of the port to engage the seal member in place in the port. The head portion of the seal may include a dome-shaped top surface and flat bottom surface, the flat bottom surface engages with a surface about the perimeter of the first opening in the port. The film may be disposed in a cavity formed in the seal member extending between an opening in the top surface of the head portion to an opening in the flange portion and wherein the re-closable aperture of the film may include a plurality of pie cuts.

One skilled in the art will appreciate that the present teachings can be practiced with embodiments other than those summarized or disclosed below by the Figures and Detailed Description of the Invention to follow.

BRIEF DESCRIPTION OF THE FIGURES

Embodiments of the present invention will now be described, by way of example only, with reference to the attached Figures, wherein.

DETAILED DESCRIPTION OF THE INVENTION

Figure 1A:
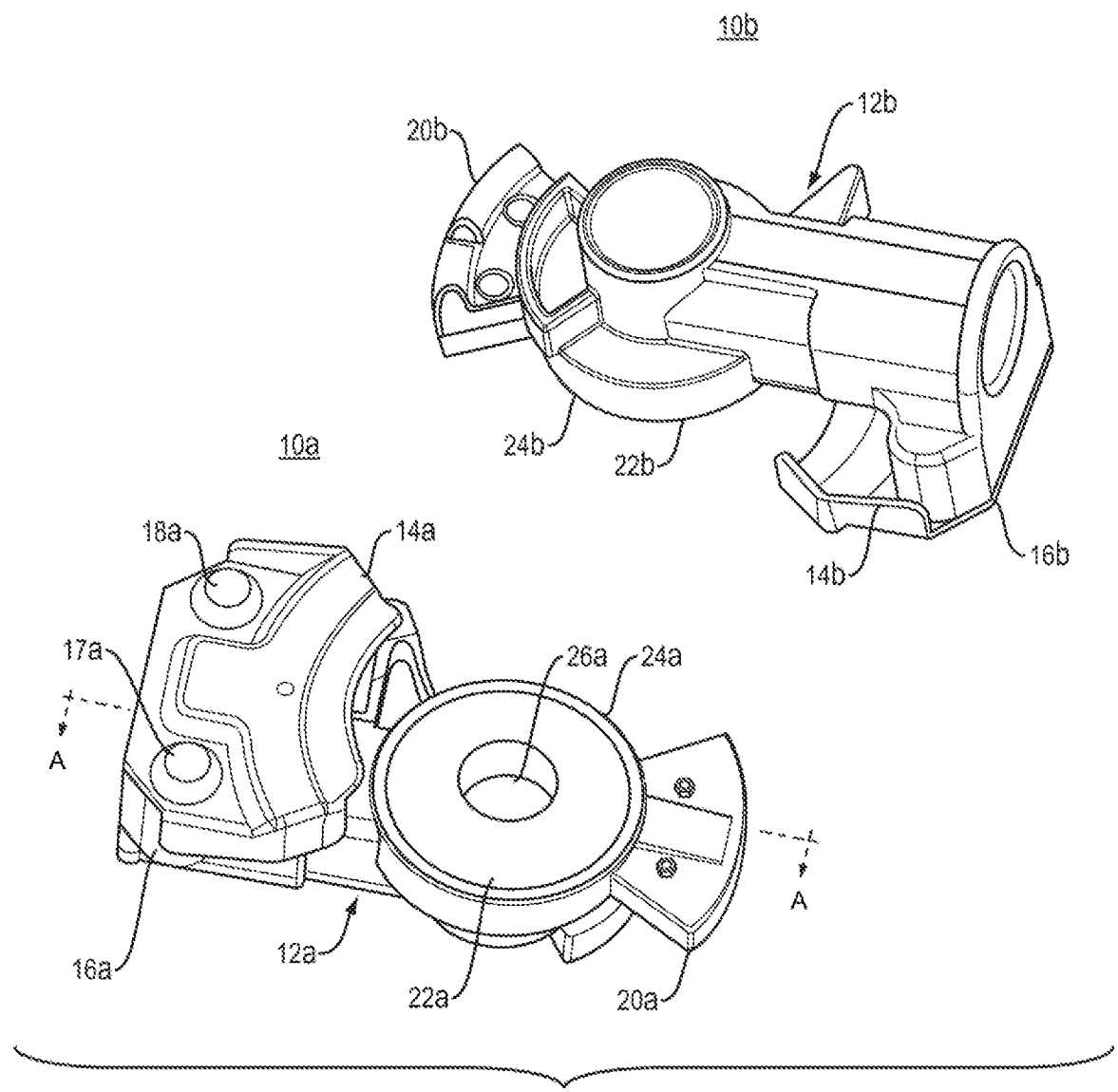
FIG. 1A shows a pair of opposing gladhand assemblies in an unmated position.
Figure 1B:
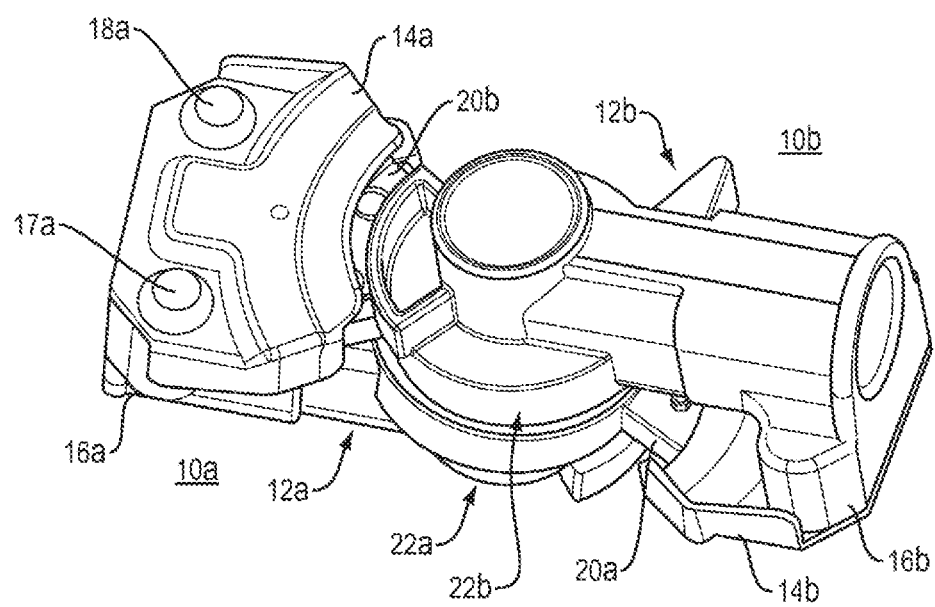
FIG. 1B shows a pair of opposing gladhand assemblies in a mated and interlocked position.

A pair of opposing gladhand assemblies 10a and 10b are shown in FIG. 1A in an unmated position and in FIG. 1B in a mated and interlocked position. The gladhand assemblies comprise elongated body portions 12a/12b, which are typically formed of a metal, such as cast iron, steel or aluminum, and which may have an anodized surface coating such as a powder coating which may be more resilient to damage. Each gladhand assembly includes a clamp member 14a/14b affixed to a leg member 16a/16b, which leg members extend radially outward from the longitudinal axis of each body proximate one end thereof. The clamp members may be integrally formed with the leg members or they may be separate components affixed with bolts 17a and 18a, for example, to the leg member.

At the other end of the body portions 12a/12b, opposite the ends with the clamp members 14a/14b, are included striker plates 20a/20b which engage with complementary clamp members on the other gladhand assembly when the gladhand assemblies are mated and interlocked as is shown in FIG. 1B. In other words, in the mated position shown in FIG. 1B, striker plate 20b of gladhand assembly 10b is interlocked with clamp member 14a of gladhand assembly 10a and striker plate 20a of gladhand assembly 10a is interlocked with striker plate 20b of gladhand assembly 10b.

When the gladhand assemblies 10a/10b are mated, seals 22a and 22b, which cover cylindrical ports 24a and 24b, respectively, are in opposing relationship and in contact with each other with apertures 26a and 26b (not visible in FIG. 1A) aligned and forming a closed seal. The seals may be formed of a polyurethane material. Although not visible in this figure, there is a membrane or film disposed within apertures 26a and 26b which includes openings. In a preferred embodiment the openings may be a plurality of pie cuts in the center section of the membrane. The membrane with openings provides some level of protection against the ingress of dirt, debris and moisture to some degree, while also allowing air to flow easily from one gladhand assembly to the other when the gladhand assemblies are mated and interlocked and when air is flowing in the system to which the gladhands are connected. For example, the glad hands may be coupled to hoses supplying pressurized air from a tractor unit to air brakes on a semi-trailer, or from a locomotive to railway air brakes on railroad cars.

Figure 2:
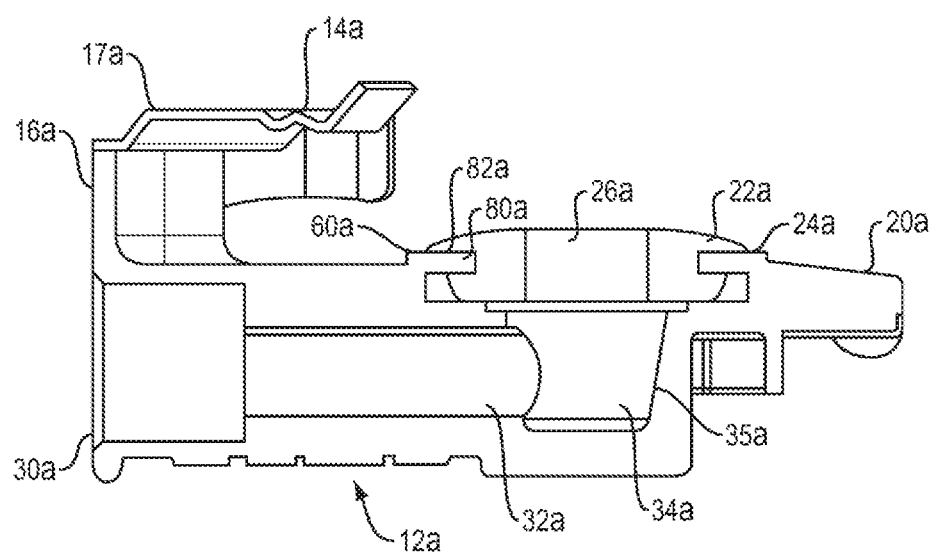
FIG. 2 shows a longitudinal cross-sectional view of one of the gladhand assemblies of FIG. 1A taken along line A-A

As shown in FIG. 2, which is a longitudinal cross-sectional view of gladhand assembly 10a of FIG. 1A taken along line A-A, a hose supplying pressurized air may be interconnected to hose coupling 30a. Gladhand assembly 10b is not shown in detail as is gladhand assembly 10a in FIGS. 2-5, as they are of the same design. It will be understood that gladhand assembly 10b has a set of comparable elements which are described only with regard to gladhand assembly 10a.

Hose coupling 30a is formed by a cylindrical cavity within the end of body 12a proximate the leg 16a and sized to receive a hose (not shown). Hose coupling 30a is in fluid communication with a conduit 32a and when pressurized air is flowing from the hose it travels through conduit 32a and into interior cavity 34a of cylindrical port 24a. From port 24a, the pressurized air then travels through aperture 26a in seal member 22a. Although not shown in this FIG. 2, the pressurized air would flow from aperture 26a to gladhand assembly 10b through a like aperture in its seal 22b. The pressurized air may also flow in the opposite direction when it is flowing from gladhand assembly 10b into gladhand assembly 10a.

Figure 3:
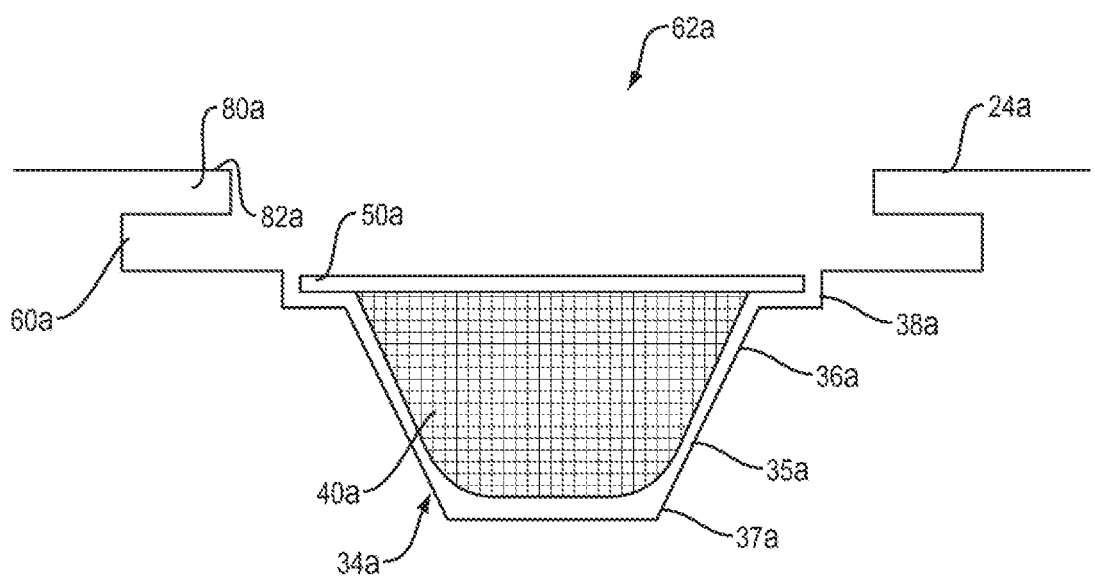
FIG. 3 shows a cross sectional view of the port of a gladhand assembly with the filter member installed.
Figure 4A:
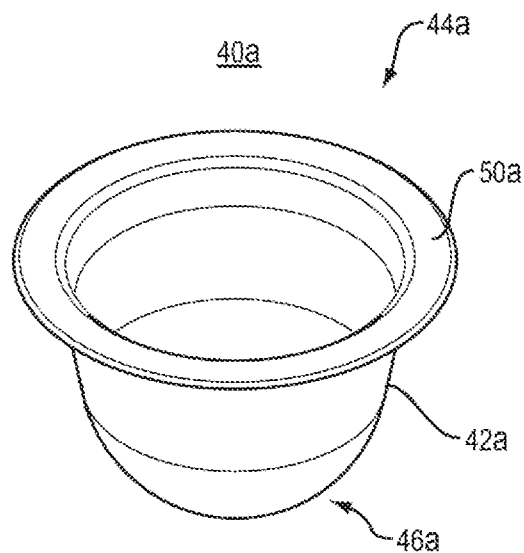
FIG. 4A shows a perspective view of a filter member according to an embodiment of the invention.

Referring to FIG. 3, interior cavity 34a of cylindrical port 24a may be cylindrical in shape with straight sidewalls from the top of the cavity to the bottom or it may have sloped sidewalls, as is the case with the embodiment of shown. In a region of cavity 34a where a filter is located (as described below) the sidewalls 35a are sloped inwardly from upper area 36a to the bottom 37a of cavity 34a. Adjacent the upper area 36a of sidewall 35a is a first recess or lip 38a which is circular in shape and surrounds the upper area 36a. First recess 38a may be machined into the sidewall 35a. Within interior cavity 34a is disposed a removable filter member 40a. Referring also to FIG. 4A, filter 40a includes a cylindrically shaped sidewall 42a which slopes from a wider diameter at a first opening 44a to a bottom surface 46a having a reduced diameter. The sidewall 42a may be formed of a metallic mesh screen made a stainless steel or the like and it may be sloped in a complementary way with respect to sidewall 35a of interior cavity 34a so that filter 40a fits snugly.

At the top of sidewall 42a and around opening 44a is a circular rim 50a, which may also be formed of stainless steel and may be welded to the top of sidewall 42a. Rim 50a has an outer diameter greater than the diameter of the top of sidewall 42a of filter member 40a and also greater than the diameter of sidewall 35a of cavity 34a. As is shown in FIG. 3, when the filter member 40a is inserted into cavity 34a of port 24a, rim 50a fits into and is seated on the first recess or lip 38a keeping the filter member 40a secure. Filter member 40a is shaped to enable the user to easily push it into the opening of gladhand assembly 10a for installation as its sidewall 42a fits up against sidewall 35a to provide a means of filtering dirt and debris from entering the cavity 34a and flowing into other areas of the air brake system when pressurized air is flowing. The filter member is easily removed by a user for cleaning when service is required.

Figure 4B:
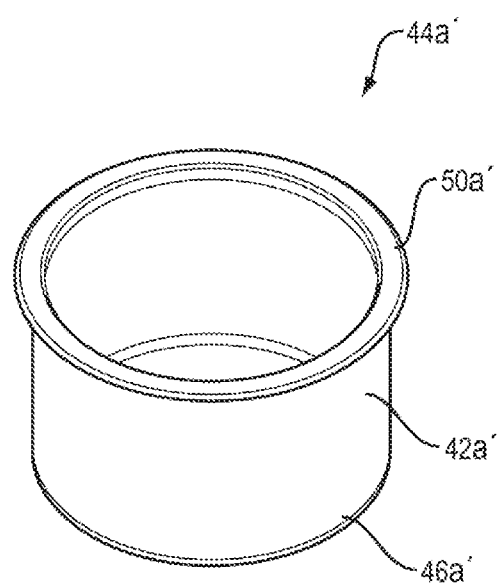
FIG. 4B shows a perspective view of a filter member according to another embodiment of the invention.

While not depicted in the figures, sidewall 35a may have straight sides in which case filter member 44a' shown in FIG. 4B may also have a sidewall 42a' with straight sides in order to provide a proper fit within the cavity. Filter member 44a' also includes a top opening 44a' and a bottom surface 46a', as well as a circular rim 50a' which would be seated on first recess or lip 38a to keep the filter member 40a' secure. Based on its appearance, this type of filter member may be referred to as a "Top Hat" type filter. This shape provides a larger area of filtration, so in certain applications it may be preferable to the design of filter member 40a of FIG. 4A. It should be noted that other filter shapes could be used, including conical shaped filter members as well as rectangular shaped filter members which would include a number of sidewalls. In that case, the sidewall 35a of cavity 24a would need to be similarly shaped. While different shaped sidewalls/filter members may be used, the common thread is that they would each include a rim with a larger outer diameter for seating on first recess 38a to keep the filter member secure in place when installed and easily removable when service is required.

Referring again to FIGS. 2 and 3, there is shown a second recess 60a in port 24a of gladhand assembly 10a. Second recess 60a is circular in shape and is of a larger diameter than the first recess 38a. Second recess 60a is configured to received seal member 22a when it is inserted into port 24a. Second recess 60a is positioned adjacent to the first recess but separated from it so that filter member 40a when seated in the first recess does not interfere with the operation of the seal 22a. In other words, the design and mounting of the seal and the filter member within cavity 24a provide an air seal that is not affected by filter member. This is not the case in prior art assemblies where the filter member is in contact with the seal and can negatively impact the sealing effect and performance.

Figure 5A:
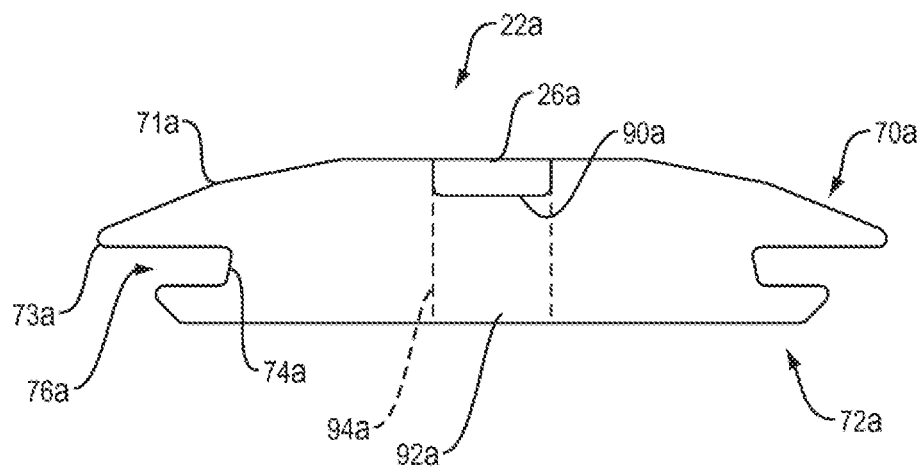
FIG. 5A shows a cross-sectional view of the seal member according to an embodiment of this invention.
Figure 5B:
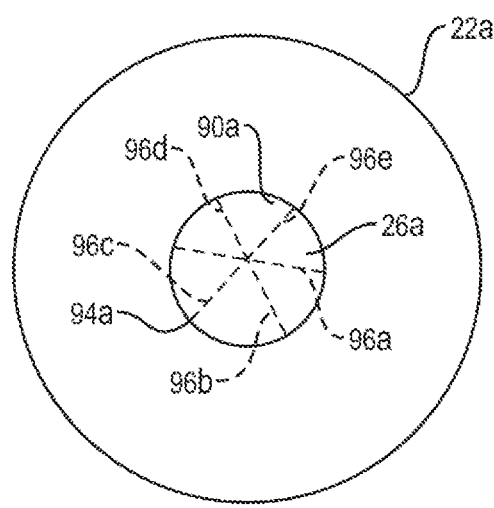
FIG. 5B shows a top down view of the seal member of FIG. 5A.

Seal member 22a is configured to engage with and close the first opening 62a (FIG. 3) in the port 24a. As shown in FIGS. 5A and 5B the seal member 22a includes a circular head portion 70a having a first diameter and a circular flange portion 72a having a second diameter. The first diameter is larger than the second diameter so the head portion 70a extends out beyond the circular flange portion 72a. The seal member 22a also includes an inner cylindrical wall 74a positioned between the head portion and the flange portion which has a diameter less than that of the first diameter and the second diameter. There is a seal member recess 76a defined by a space formed between the head portion 70a and the flange portion 72a and terminating at the inner cylindrical wall 74a. About first opening 62a in port 24a, FIGS. 2 and 3, there is a cylindrical lip 80a which, when seal 22a is inserted, projects into the seal member recess 76a and the flange portion 72a of the seal member 22a projects into the second recess 60a of port 24a to engage the seal member in place in the port. The head portion 70a of the seal 22a includes a dome-shaped top surface 71a and flat bottom surface 73a. The flat bottom surface 73a engages with a surface 82a about the perimeter of the first opening 62a in the port 24a.

Within seal member 22a there is a film or membrane 90a (FIGS. 5A and 5B) disposed in aperture 26a, which aperture is formed in the top surface 71a of the head portion 70a and extends through an interior region 92a defined by the inner cylindrical wall 94a. Film 90a may include a re-closable opening, which may be formed by a plurality of pie cuts, e.g. 96a-96e that are forced open by the pressurized air flow and closed when the pressurized airflow is terminated. Other means for making a re-closable opening may be used. This helps further prevent debris from entering into port 24a and ultimately into the hose/system.

Figure 5C:
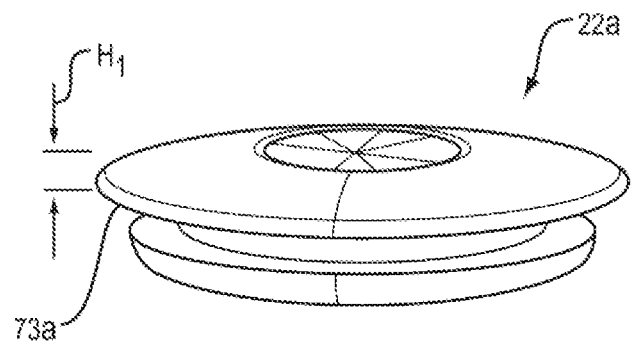
FIG. 5C shows a side perspective view of the seal member of FIG. 5A.
Figure 5D:
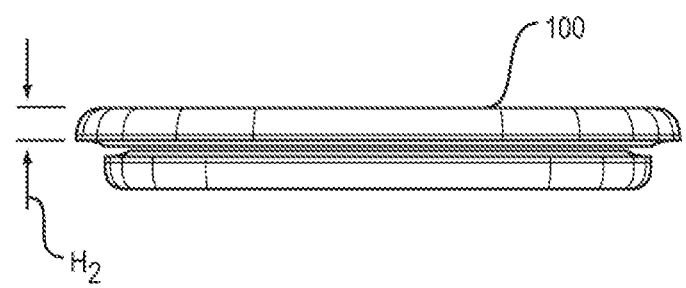
FIG. 5D shows a side perspective view of a prior art seal member.

The domed shaped head portion 70a of seal member 22a with its curved surface 71a provides a smooth engagement surface when an opposing gladhand assembly, e.g. gladhand assembly 10b, is being mated to it. Since both seal members have such curved surfaces they readily allow for smooth movement as the two surfaces frictionally engage and interact with each other during the interlocking process until they are sealed when their opposing apertures 26a and 26b meet. The curved surface also provides additional height of the seal member allowing it to be more durable over many interlocking cycles. The height of the portion of seal member 22a above the engaged surface 82a of the gladhand, from bottom surface 73a to the top of head portion 70a, $H_1$, is shown in FIG. 5C to be greater that the height above the gladhand surface of a prior art seal member 100, $H_2$, as shown in FIG. 5D. The height $H_1$ is approximately 0.12 inches and the height $H_2$ is approximately 0.08 inches.

Moreover, where the flat bottom surface 73a of head portion 70a engages with a surface 82a about the perimeter of the first opening 62a in the port 24a, there is a direct transition to curved surface 71a, which allows the mating seal members 22a and 22b to move freely when they are initially encountered rather than being caught on one another. This is unlike the prior art seal members which are disk shaped and include an outer circular edge which includes a surface perpendicular to the surface about the opening in the port. This often causes the two seal members to be caught on one another when they are first impact each other.

Another drawback with the prior art seals is that they are short and do not create a sufficiently durable seal as it collapses somewhat and as it wears and it loses its sealing capabilities. The curved surface 71a is able to provide a seal with a greater height thus improving its durability while still providing ease of mating, as described above.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto.

The invention is therefore not limited by the above described embodiments and examples, embodiments, and applications within the scope and spirit of the invention claimed as follows.

We claim:

1. A gladhand assembly configured to be coupled to a corresponding gladhand assembly, between which a fluid will flow, the gladhand assembly comprising:
   a conduit for carrying the fluid;
   a port having a sidewall defining an interior region, a first opening in fluid communication with an external environment and a second opening in fluid communication with the conduit, the port including a first recess in the interior region and disposed in the sidewall, the first recess surrounding the first opening of the port and a second recess in the interior region and disposed in the sidewall, the second recess surrounding the first opening of the port;
   a filter member including at least one sidewall and a first opening at a first end of the filter member including a rim, the rim extending outwardly from the sidewall in a radial direction and disposed about the entire first opening of the filter member; the rim being seated on the first recess in the sidewall of the port about the entire first opening of the interior region of the port; and
   a seal member configured to engage with and close the first opening in the port; the seal member including a flange portion which projects into the second recess of the port to engage the seal member in place in the port; the seal member further including a film having a first surface facing the external environment and a second surface facing the interior region of the port, the film including a re-closable aperture.

2. The gladhand assembly of claim 1, wherein the filter member includes a mesh filter.

3. The gladhand assembly of claim 2, wherein the mesh filter comprises a metallic material.

4. The gladhand assembly of claim 1 wherein the filter member further includes a bottom surface at a second end of the filter member.

5. The gladhand assembly of claim 1 wherein the sidewall of the port is cylindrical in shape and wherein the first recess is disposed about the sidewall and is cylindrical in shape.

6. The gladhand assembly of claim 5 wherein the second recess is cylindrically shaped and disposed in the sidewall located between the first recess and the first opening of the port.

7. The gladhand assembly of claim 6, wherein the seal member includes a circular head portion having a first diameter and the flange portion is circular and has a second diameter; wherein the first diameter is larger than the second diameter; wherein the seal member includes an inner cylindrical wall positioned between the head portion and the flange portion and having a diameter less than that of the first diameter and the second diameter; and wherein the seal member includes a seal member recess defined by a space formed between the head portion and the flange portion and terminating at the inner cylindrical wall.

8. The gladhand assembly of claim 7, wherein the first opening in the port includes a cylindrical lip which projects into the seal member recess.

9. The gladhand assembly of claim 8, wherein the head portion of the seal includes a dome-shaped top surface and flat bottom surface, the flat bottom surface engages with a surface about the perimeter of the first opening in the port.

10. The gladhand assembly of claim 9, wherein the film is disposed in a cavity formed in the seal member extending between an opening in the top surface of the head portion to an opening in the flange portion; and wherein the re-closable aperture of the film includes a plurality of pie cuts.

* * * * *